US010476144B2

(12) United States Patent
Mizutani et al.

(10) Patent No.: US 10,476,144 B2
(45) Date of Patent: Nov. 12, 2019

(54) CAR AND CAR ANTENNA DEVICE

(71) Applicants: KABUSHIKI KAISHA TOYOTA JIDOSHOKKI, Kariya-shi, Aichi-ken (JP); YOKOWO CO., LTD., Tokyo (JP)

(72) Inventors: Yuichi Mizutani, Kariya (JP); Tomohiko Yamase, Tomioka (JP); Seiji Go, Tomioka (JP)

(73) Assignees: KABUSHIKI KAISHA TOYOTA JIDOSHOKKI, Kariya-shi, Aichi-ken (JP); YOKOWO CO., LTD., Tokyo (JP)

( * ) Notice: Subject to any disclaimer, the term of this patent is extended or adjusted under 35 U.S.C. 154(b) by 0 days.

(21) Appl. No.: 15/557,686

(22) PCT Filed: Feb. 23, 2016

(86) PCT No.: PCT/JP2016/055277
§ 371 (c)(1),
(2) Date: Sep. 12, 2017

(87) PCT Pub. No.: WO2016/147815
PCT Pub. Date: Sep. 22, 2016

(65) Prior Publication Data
US 2018/0053992 A1    Feb. 22, 2018

(30) Foreign Application Priority Data
Mar. 16, 2015    (JP) .................................. 2015-052015

(51) Int. Cl.
*H01Q 1/32*    (2006.01)
*B60R 11/02*    (2006.01)
(Continued)

(52) U.S. Cl.
CPC ........... *H01Q 1/3275* (2013.01); *B60R 11/02* (2013.01); *H01Q 1/1235* (2013.01); *H01Q 1/22* (2013.01);
(Continued)

(58) Field of Classification Search
CPC ........ H01Q 1/3275; H01Q 1/42; H01Q 21/28; H01Q 9/0407; H01Q 1/38; H01Q 1/32; H01Q 1/241
(Continued)

(56) References Cited

U.S. PATENT DOCUMENTS

| 2008/0180332 | A1  | 7/2008 | Noro et al. |
| 2014/0125531 | A1* | 5/2014 | Kaneko ................ H01Q 1/3275 343/713 |
| 2015/0123854 | A1* | 5/2015 | Chakam ............... H01Q 1/1214 343/702 |
| 2015/0229020 | A1  | 8/2015 | Sugimoto et al. |

(Continued)

FOREIGN PATENT DOCUMENTS

| EP | 1777779 A1 * | 4/2007 | ........... H01Q 1/1214 |
| JP | 2005-57653 A |  3/2005 | |

(Continued)

OTHER PUBLICATIONS

International Preliminary Report on Patentability dated Sep. 19, 2017, in counterpart International Application No. PCT/JP2016/055277.

*Primary Examiner* — Linh V Nguyen
(74) *Attorney, Agent, or Firm* — Sughrue Mion, PLLC

(57) ABSTRACT

A vehicle includes a roof panel and a vehicle antenna device. The roof panel includes a roof portion and an antenna cover portion that protrudes from the roof portion and has an internal space. The vehicle antenna device includes a base portion and an upright portion that extends from the base portion into the internal space in the antenna cover portion.

(Continued)

An outer imaginary plane is assumed to extend along a boundary line on a boundary portion between an outer surface of the roof portion and an outer surface of the antenna cover portion. In a state where the vehicle antenna device is mounted on the vehicle, at least part of the base portion is located below the outer imaginary plane.

6 Claims, 3 Drawing Sheets

(51) Int. Cl.
    *H01Q 1/22*         (2006.01)
    *H01Q 21/28*       (2006.01)
    *H01Q 1/12*         (2006.01)
    *H01Q 1/42*         (2006.01)

(52) U.S. Cl.
    CPC ............... *H01Q 1/32* (2013.01); *H01Q 21/28* (2013.01); *H01Q 1/42* (2013.01)

(58) Field of Classification Search
    USPC ......................................... 343/702, 711–713
    See application file for complete search history.

(56) References Cited

U.S. PATENT DOCUMENTS

| | | | |
|---|---|---|---|
| 2015/0280316 A1* | 10/2015 | Iso | H01Q 1/06 343/713 |
| 2015/0307026 A1* | 10/2015 | Minikey, Jr. | B60R 11/04 348/148 |
| 2015/0325906 A1* | 11/2015 | Lerchner | H01Q 1/3275 343/713 |
| 2015/0349409 A1 | 12/2015 | Imamura | |
| 2017/0062914 A1* | 3/2017 | Masaka | H01Q 1/1214 |
| 2017/0179584 A1* | 6/2017 | Nakada | H01Q 1/3275 |
| 2017/0214129 A1* | 7/2017 | Ohno | H01Q 1/52 |
| 2017/0317407 A1* | 11/2017 | Yasin | H01Q 1/3275 |
| 2017/0365917 A1* | 12/2017 | Cho | H01Q 1/3275 |
| 2018/0083348 A1* | 3/2018 | Thiam | H01Q 1/3275 |
| 2018/0277922 A1* | 9/2018 | Kim | H01Q 1/1214 |

FOREIGN PATENT DOCUMENTS

| | | |
|---|---|---|
| JP | 2008-182523 A | 8/2008 |
| JP | 2013-9143 A | 1/2013 |
| JP | 2014-50031 A | 3/2014 |
| WO | 2014/003078 A1 | 1/2014 |

\* cited by examiner

US 10,476,144 B2

CAR AND CAR ANTENNA DEVICE

CROSS REFERENCE TO RELATED APPLICATIONS

This application is a National Stage of International Application No. PCT/JP2016/055277 filed Feb. 23, 2016, claiming priority based on Japanese Patent Application No. 2015-052015, filed Mar. 16, 2015, the contents of all of which are incorporated herein by reference in their entirety.

TECHNICAL FIELD

The present invention relates to a vehicle including a vehicle antenna device and to a vehicle antenna device.

BACKGROUND ART

Vehicle antenna devices for AM/FM broadcasting, television broadcasting, GPS, and the like are conventionally mounted on vehicles. The vehicle antenna device is typically mounted on the roof, which affords an unobstructed view and is the highest portion of the vehicle.

As shown in FIGS. 6A and 6B, a vehicle antenna device 51 described in Patent Document 1 includes a base portion 53 and an upright portion 54, which extends upward from the base portion 53. The vehicle antenna device 51 and an antenna cover portion 52, which accommodates the entire vehicle antenna device 51, constitute an antenna unit 50. The antenna unit 50 is mounted on a vehicle roof 101.

PRIOR ART DOCUMENT

Patent Document

Patent Document 1: Japanese Laid-Open Patent Publication No. 2014-50031

SUMMARY OF THE INVENTION

Problems that the Invention is to Solve

According to the antenna unit 50 described in Patent Document 1, the base portion 53 is attached to the vehicle roof 101 and thus the antenna cover portion 52, which accommodates the entire base portion 53, becomes large.

An objective of the present invention is to provide a vehicle antenna device that achieves a downsized antenna cover portion and a vehicle including such a vehicle antenna device.

Means for Solving the Problems

To achieve the foregoing objective and in accordance with one aspect of the present invention, a vehicle that includes a roof panel and a vehicle antenna device is provided. The roof panel includes a roof portion and an antenna cover portion that protrudes from the roof portion and has an internal space. The vehicle antenna device includes a base portion and an upright portion that extends from the base portion into the internal space in the antenna cover portion. An outer imaginary plane is assumed to extend along a boundary line on a boundary portion between an outer surface of the roof portion and an outer surface of the antenna cover portion. In a state where the vehicle antenna device is mounted on the vehicle, at least part of the base portion is located below the outer imaginary plane.

To achieve the foregoing objective and in accordance with another aspect of the present invention, a vehicle antenna device is provided that is configured to be attached to a vehicle that includes a roof panel. The roof panel includes a roof portion and an antenna cover portion that protrudes from the roof portion and has an internal space. The vehicle antenna includes a base portion and an upright portion that extends from the base portion into the internal space in the antenna cover portion. An outer imaginary plane is assumed to extend along a boundary line on a boundary portion between an outer surface of the roof portion and an outer surface of the antenna cover portion. In a state where the vehicle antenna device is mounted on the vehicle, at least part of the base portion is located below the outer imaginary plane.

MODES FOR CARRYING OUT THE INVENTION

A vehicle 10 and a vehicle antenna device 30 according to one embodiment will now be described with reference to the drawings. In the following descriptions, a front-rear direction corresponds to the front-rear direction of the vehicle 10, and a vertical direction corresponds to the height direction of the vehicle 10.

Figure 1:
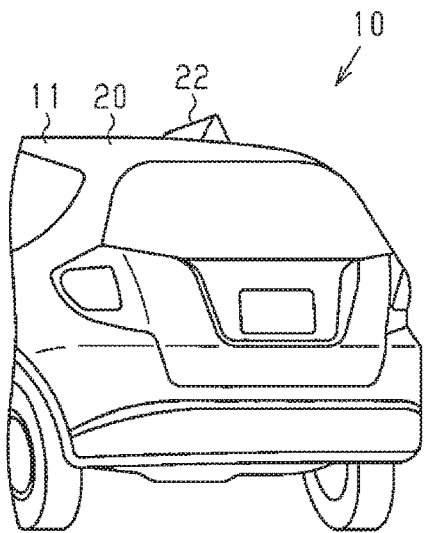
FIG. 1 is a rear view of a vehicle according to one embodiment.

As shown in FIG. 1, a roof panel 20 constitutes a roof 11 of the vehicle 10. The roof panel 20 is made of plastic.

Figure 2:
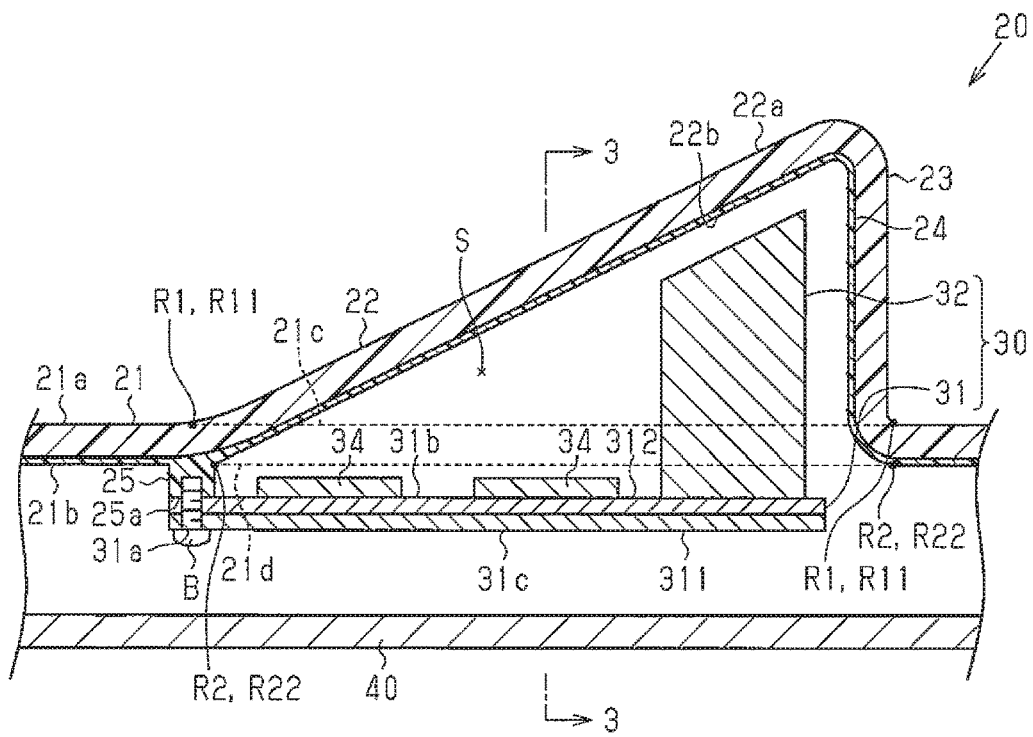
FIG. 2 is a cross-sectional view of a vehicle antenna device that is accommodated in an antenna cover portion.

As shown in FIG. 2, the roof panel 20 includes a roof portion 21 and an antenna cover portion 22 that protrudes from the roof portion 21. The roof panel 20 is an integrally molded article including the roof portion 21 and the antenna cover portion 22.

The roof panel 20 will now be described.

The roof panel 20 is manufactured by two-shot molding of a first molded portion 23 and a second molded portion 24. The first molded portion 23 is made of a material that transmits light whereas the second molded portion 24 is made of a material that does not transmit light. In a state where the roof panel 20 is attached to the vehicle 10, the first molded portion 23 is located on the outer side of the vehicle 10 with respect to the second molded portion 24. The second molded portion 24 is located on the inner side of the vehicle 10 with respect to the first molded portion 23. The surface of the first molded portion 23 located on the outer side of the vehicle 10 when the roof panel 20 is attached to the vehicle 10 corresponds to the outer surface of the roof panel 20, that is, an outer surface 21a of the roof portion 21 and an outer surface 22a of the antenna cover portion 22. The surface of the second molded portion 24 located on the inner side of the vehicle 10 when the roof panel 20 is attached to the vehicle 10 corresponds to the inner surface of the roof panel 20, that is, an inner surface 21b of the roof portion 21 and an inner surface 22b of the antenna cover portion 22.

The roof portion 21 will now be described.

Figure 3:
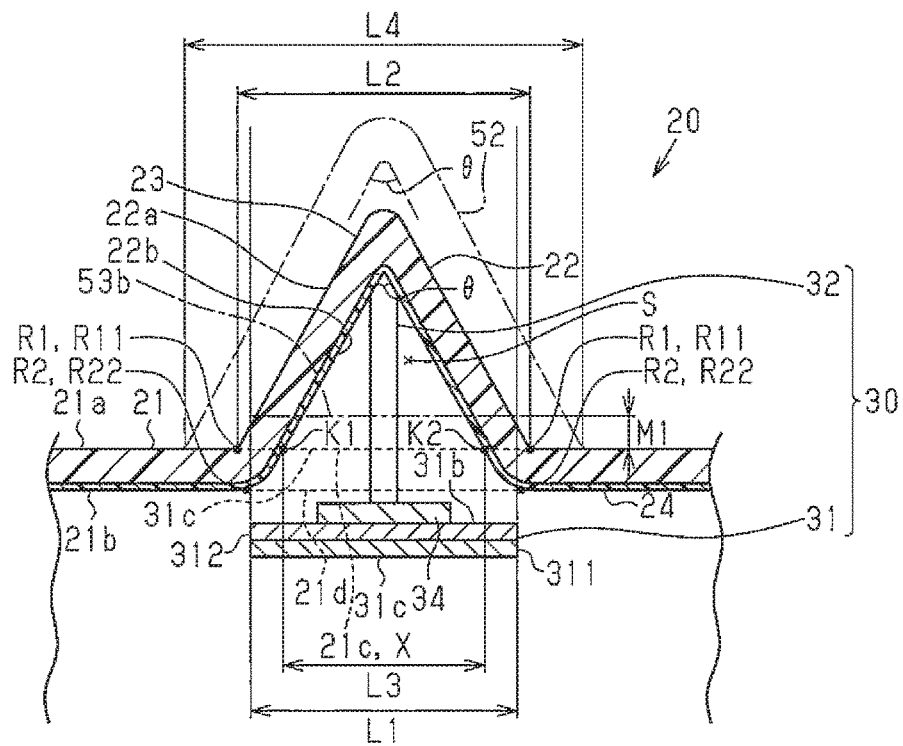
FIG. 3 is a cross-sectional view taken along line 3-3 of FIG. 2.

As shown in FIGS. 2 and 3, the roof portion 21 is part of the roof panel 20 where the antenna cover portion 22 is not provided.

The antenna cover portion 22 will now be described.

As shown in FIG. 1, the antenna cover portion 22 is located on a rear part of the roof panel 20 and substantially at the center in a vehicle width direction. As shown in FIGS. 2 and 3, the antenna cover portion 22 protrudes from the outer surface 21a of the roof portion 21 toward outside of the vehicle 10 and includes an internal space S. The curvature of the roof portion 21 is different from that of the antenna cover portion 22. A boundary portion between the outer surface 21a of the roof portion 21 and the outer surface 22a of the antenna cover portion 22 is referred to as an outer protrusion starting portion R1. A boundary portion between the inner surface 21b of the roof portion 21 and the inner surface 22b of the antenna cover portion 22 is referred to as an inner protrusion starting portion R2".

The antenna according to the present embodiment is a so-called shark fin antenna. The antenna cover portion 22 according to the present embodiment has a substantially triangular shape (specifically, a right triangular shape as shown in FIG. 2) in a cross-sectional view in the front-rear direction of the vehicle 10, and has a substantially triangular shape (specifically, an isosceles triangular shape as shown in FIG. 3) in a cross-sectional view in the vehicle width direction with its area increasing in the downward direction of the vehicle 10. That is, the antenna cover portion 22 according to the present embodiment has a substantially triangular pyramid shape of which the cross-sectional area increases from top to bottom. Lines extending along the outer protrusion starting portions R1 make a triangle (an isosceles triangle). Lines extending along the inner protrusion starting portions R2 also make a triangle (an isosceles triangle).

As shown in FIG. 2, an attaching portion 25 for attaching the vehicle antenna device 30 to the roof panel 20 is provided on the inner surface 21b of the roof portion 21 and below a position on the outer protrusion starting portion R1 nearest to the front of the vehicle 10. The attaching portion 25 is a circular boss and extends downward from the inner surface 21b of the roof portion 21. The attaching portion 25 is part of the second molded portion 24 and integrally molded with the roof portion 21 (the roof panel 20). A distal end 25a of the attaching portion 25 is substantially parallel with the roof portion 21.

The vehicle antenna device 30 includes a base portion 31 and a first antenna component 32 functioning as an upright portion.

As shown in FIG. 2, the base portion 31 includes a bottom plate 311 and a board 312 that has the same shape as the bottom plate 311 in a plan view. The board 312 is laminated on the bottom plate 311, thus forming the base portion 31. The base portion 31 is a rectangular plate including long and short sides in a plan view, and functions as a support for attaching the first antenna component 32 to the vehicle 10. The vehicle antenna device 30 and the antenna cover portion 22, which accommodates the entire vehicle antenna device 30, constitute an antenna unit. The antenna unit is mounted on the roof panel 20 of the vehicle 10.

The first antenna component 32 extends from the base portion 31 upward (in a direction crossing the base portion 31), that is, extends into the internal space S of the antenna cover portion 22. A second antenna component 34 is mounted on the base portion 31 in the front of the first antenna component 32. The first antenna component 32 and the second antenna component 34 enable the vehicle antenna device 30 to function as an antenna. The projecting length of the first antenna component 32 according to the present embodiment from the base portion 31 is larger than that of the second antenna component 34. The width of the first antenna component 32 in the vehicle width direction is less than that of the base portion 31. The first antenna component 32 may be an antenna element as a whole or may be a board having an antenna element mounted thereon. That is, the first antenna component 32 is a member that protrudes from the base portion 31 and at least includes an antenna element.

In the present embodiment, the vehicle antenna device 30 is arranged on the vehicle 10 so that the vehicle width direction is aligned with the short side direction of the base portion 31. The first antenna component 32 is arranged on the base portion 31 so that the plate thickness direction of the first antenna component 32 is perpendicular to the plate thickness direction of the base portion 31.

As shown in FIG. 3, the length of the base portion 31 in the short side direction (the width of the base portion 31) is referred to as a length L1, and it is assumed that there is an area above the base portion 31 that extends along the upright direction of the first antenna component 32 and has a width of the length L1. According to the present embodiment, the first antenna component 32 and the second antenna component 34 are accommodated in the area having the width of the length L1 and do not project from the area. That is, as shown in FIG. 3, in the vehicle antenna device 30 according to the present embodiment, the opposite ends of the base portion 31 in the short-side direction (the opposite ends of the base portion 31 along the long sides) are at the outermost positions in the front view of the vehicle antenna device 30.

As shown in FIG. 2, an insertion hole 31a is provided in an end of the base portion 31 that is closer to the front of the vehicle 10 (a front end portion). Specifically, the bottom plate 311 and the board 312 include through-holes extending in the thickness direction and these holes constitute the insertion hole 31a.

An interior panel 40 that constitutes the interior of the vehicle 10 is attached to the vehicle 10 below the roof panel 20 and the base portion 31 of the vehicle antenna device 30 attached to the vehicle 10.

A method of accommodating the vehicle antenna device 30 in the antenna cover portion 22 will now be described below with reference to FIGS. 2 and 3, by comparing to conventional techniques. An operation thereof is also described below.

The long dashed short dashed lines shown in FIG. 3 are used for describing the vehicle antenna device 51 according to the conventional technique (see FIGS. 6A and 6B), which is a comparison example. To simplify the description, the antenna cover portion 52 of the conventional technique is similar to the antenna cover portion 22 of the present embodiment. Consequently, the opening angle θ of the top of the antenna cover portion 52 according to the conventional technique is equal to the opening angle θ of the top of the antenna cover portion 22 according to the present embodiment.

The dimensions of members will be described first.

As shown in FIG. 3, in the present embodiment, the distance between the outer protrusion starting portions R1 opposed to each other in the vehicle width direction is defined as the external dimension of the antenna cover portion 22 in the vehicle width direction. The external dimension of the antenna cover portion 22 is defined as a length L2. When assuming the line connecting the outer protrusion starting portions R1 opposed to each other in the vehicle width direction to be an imaginary line X, the distance between an intersection point K1 and an intersection point K2 of the imaginary line X and the inner surface of the antenna cover portion 22 is defined as the internal dimension of the antenna cover portion 22 in the vehicle width direction. The internal dimension of the antenna cover portion 22 is defined as a length L3. As shown in FIG. 3, the external dimension of the antenna cover portion 52 according to the conventional technique shown by the long dashed short dashed line is defined as a length L4. The lengths L2 and L3 vary depending on the planar shape of the antenna cover portion 22 as viewed from above the vehicle 10 and the cross-sectional position of the planar shape in the front-rear direction. For example, it is assumed that the antenna cover portion has a substantially elliptical shape in a plan view, and the antenna cover portion is arranged so that the vehicle front-rear direction is aligned with the major axis direction of an ellipse. In such a case, the lengths L2 and L3 decrease toward an end of the ellipse in the front-rear direction. On the other hand, the lengths L2 and L3 increase toward the center of the ellipse.

As shown in FIGS. 2 and 3, a boundary line R11 is assumed to extend along the boundary portion between the outer surface 21a of the roof portion 21 and the outer surface 22a of the antenna cover portion 22, that is, the outer protrusion starting portion R1. In a plan view of the vehicle 10 from above, the boundary line R11 is seen to be endless (to have a triangular shape). An outer imaginary plane 21c is assumed to include the boundary line R11 as the outline and has the same curvature as the outer surface 21a. Similarly, a boundary line R22 is assumed to extend along the boundary portion between the inner surface 21b of the roof portion 21 and the inner surface 22b of the antenna cover portion 22, that is, the inner protrusion starting portion R2. In a plan view of the vehicle 10 from above, the boundary line R22 is seen to be endless (to have a triangular shape). An inner imaginary plane 21d is assumed to include the boundary line R22 as the outline and has the same curvature as the inner surface 21b. In short, the outer imaginary plane 21c includes the boundary line R11 and the inner imaginary plane 21d includes the boundary line R22.

Figure 6A:
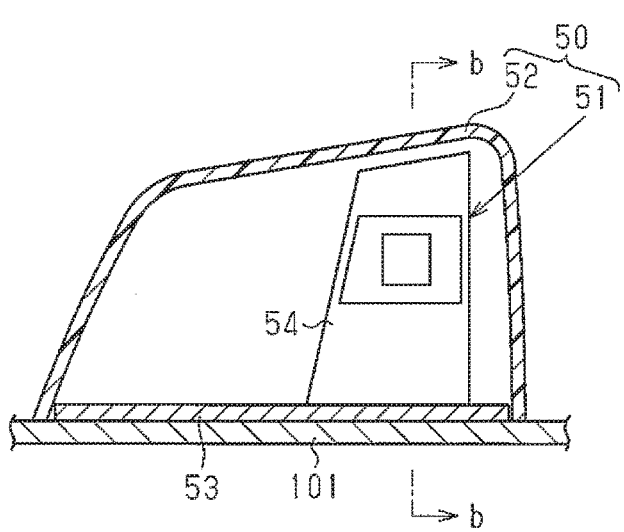
FIGS. 6A and 6B are cross-sectional views of a conventional vehicle antenna device that is accommodated in an antenna cover portion.
Figure 6B:
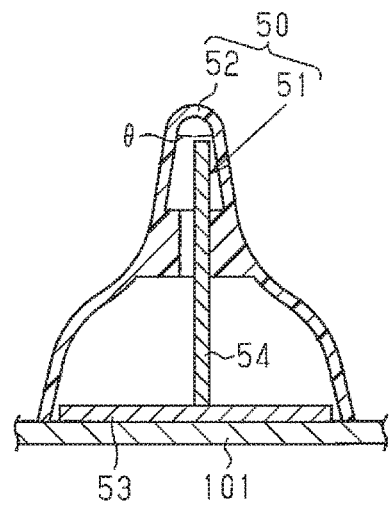

As shown in FIG. 3 by the long dashed short dashed line, the base portion 53 of the vehicle antenna device 51 according to the conventional technique is located on the same level in the vertical direction as the outer surface 21a of the roof portion 21 (on the outer imaginary plane 21c) (see positions shown in FIGS. 6A and 6B). The projecting length of the base portion 53 from the outer imaginary plane 21c according to the conventional technique is defined as a length M1. The length M1 is equal to the thickness of the base portion 53.

The following relationship between the lengths is defined in the vehicle antenna device 51 according to the conventional technique so that an end in the width-direction of a surface (hereinafter, an outer surface 53b) of the base portion 53 farthest from the outer imaginary plane 21c does not abut against the inside of the antenna cover portion 52. That is, the internal dimension of the antenna cover portion 52 is larger than the length of the base portion 53 in the short side direction for the purpose of leaving a space for accommodating the base portion 53 in the antenna cover portion 52. If the thickness of the antenna cover portion 52 does not change regardless of the vertical position of the base portion 53, as the internal dimension of the antenna cover portion 52 increases, the outer dimension (the length L4) of the antenna cover portion 52 increases, accordingly. That is, the external dimension (L4) of the antenna cover portion 52 according to the conventional technique is larger than the external dimension (the length L2) of the antenna cover portion 22 according to the present embodiment. As the external dimension of the antenna cover portion 52 increases, the internal space of the antenna cover portion 52 increases accordingly.

Meanwhile, as shown in FIG. 2, according to the present embodiment, a screw B is inserted into the insertion hole 31a of the base portion 31 and the attaching portion 25 of the antenna cover portion 22 from below the outer imaginary plane 21c along the upright direction of the attaching portion 25 for the purpose of attaching the vehicle antenna device 30 to the roof panel 20 from the inside of the roof panel 20. In such a state, the first antenna component 32 is accommodated in the internal space S of the antenna cover portion 22. Additionally, the entire base portion 31 attached via the attaching portion 25 to the vehicle 10 is located so as not to be above the outer imaginary plane 21c. That is, the projecting length of the base portion 31 from the outer imaginary plane 21c according to the present embodiment is shorter than the projecting length of the base portion 53 from the outer imaginary plane 21c according to the conventional technique. The base portion 31 does not project from the outer imaginary plane 21c in the present embodiment (the projecting length is 0).

The projecting length of the base portion 31 from the outer imaginary plane 21c is short in the present embodiment, and thus the internal space S for accommodating the base portion 31 in the antenna cover portion 22 is smaller than the internal space according to the conventional technique. This reduces the external dimension of the antenna cover portion 22. Therefore, as compared to a case of mounting the vehicle antenna device 51 on the outer surface of the roof 101 as in the conventional technique, the entire antenna cover portion 22 is downsized.

As shown in FIGS. 2 and 3, an outer surface 31b of the base portion 31 is below the outer imaginary plane 21c and the inner imaginary plane 21d in the present embodiment. In such a case, the base portion 31 does not project upward from the outer imaginary plane 21c, and thus it is not necessary to leave the space for accommodating the base portion 31 in the antenna cover portion 22. The external dimension of the antenna cover portion 22 is thus further reduced. Therefore, it is possible to further downsize the entire antenna cover portion 22.

The above-embodiment achieves the following advantages.

(1) When at least part of the base portion 31 is located below the outer imaginary plane 21c, the projecting length of the base portion 31 from the outer imaginary plane 21c is shorter than that in the case where the entire base portion 31 is located above the outer imaginary plane 21c. It is thus possible to reduce the internal space S for accommodating the vehicle antenna device 30 in the antenna cover portion 22. If the thickness of the antenna cover portion 22 does not change regardless of the vertical position of the base portion 31, as the internal space S for accommodating the base portion 31 in the antenna cover portion 22 reduces, the outer dimension of the antenna cover portion 22 reduces accordingly. Therefore, it is possible to downsize the entire antenna cover portion 22.

(2) Downsizing the entire antenna cover portion 22 improves the aerodynamic performance of the vehicle 10.

(3) Downsizing the entire antenna cover portion 22 improves the overall appearance of the antenna cover portion 22.

(4) If there is no constraint that the vehicle antenna device 30 must be attached to the outer surface 21a of the roof portion 21 and the vehicle antenna device 30 is attached at an optimal position, the antenna performance improves.

(5) When a roof portion and an antenna cover portion are separate members (for example, see Patent Document 1) and a vehicle antenna device is attached to the outer surface of the roof portion, it is necessary to provide a member for fixing the vehicle antenna device to the outer surface of the roof portion and a sealing member for closing the gap between the roof portion and the antenna cover portion. However, according to the present embodiment, the roof portion 21 is integrated with the antenna cover portion 22 and thus the vehicle antenna device 30 can be attached from the inside of the roof panel 20 and does not need to be attached on the outside of the vehicle 10. It is not necessary to provide a member for fixing the vehicle antenna device 30 to the outer surface 21a of the roof portion 21 and a sealing material. Consequently, it is possible to reduce the costs for attaching the vehicle antenna device 30.

(6) The roof portion 21 is integrated with the antenna cover portion 22 and thus a parting line is not provided on the boundary portion between the roof portion 21 and the antenna cover portion 22. Consequently, the overall appearance of the antenna cover portion 22 is improved.

(7) Since the attaching portion 25 is integrally formed with the roof portion 21 (the roof panel 20), it is possible to reduce the number of components for attaching the vehicle antenna device 30. The roof portion 21 (the roof panel 20) can be integrally molded with the attaching portion 25 by plastic molding; it is possible to prevent the position of the attaching portion 25 from differing from product to product. It is thus possible to improve the positional accuracy of the attaching portion 25. Such an improvement in the positional accuracy of the attaching portion 25 results in an improvement in the positional accuracy of the vehicle antenna device 30. A case is thus prevented where the vehicle antenna device 30 cannot be accommodated in the antenna cover portion 22 because the vehicle antenna device 30 abuts against the antenna cover portion 22.

(8) The attaching portion 25 extends downward from the inner surface 21b of the roof portion 21. The distal end 25a of the attaching portion 25 is substantially parallel with the roof portion 21. Consequently, the base portion 31, which is attached via the attaching portion 25 to the vehicle 10, abuts against the distal end 25a of the attaching portion 25 and is substantially parallel with the roof portion 21. The entire base portion 31 is located below the outer imaginary plane 21c and the inner imaginary plane 21d. In such a case, the base portion 31 does not project upward from the outer imaginary plane 21c, and thus it is not necessary to leave the internal space S for accommodating the base portion 31 in the antenna cover portion 22. Consequently, the external dimension of the antenna cover portion 22 can be reduced as compared to a case where the base portion 31 is located above the outer imaginary plane 21c. Therefore, the entire antenna cover portion 22 can be further downsized.

The above-described embodiment may be modified as follows.

As long as the base portion 31 is allowed to be attached from inside of the roof panel 20, the attaching portion may have any shape. The position of the attaching portion is not limited to the position described in the embodiment. For example, the attaching portion may be provided below a position on the outer protrusion starting portion R1 nearest to the rear of the vehicle 10.

As long as the base portion 31 is allowed to be attached from inside of the roof panel 20, the attaching portion may be provided on the base portion 31. For example, an attaching portion that projects from the outer surface 31b of the base portion 31 in the height direction of the vehicle 10 may be provided on the outer surface 31b. The screw B is inserted from an inner surface 31c of the base portion 31 and thus the antenna cover portion 22 is attached to the attaching portion provided on the base portion 31.

The attaching portion 25 does not need to be integrally molded with the roof portion 21 (the roof panel 20), and the attaching portion 25 and the roof portion 21 may be formed as separate members. That is, the attaching portion 25 that is separated from the roof panel 20 may be attached to the roof panel 20 that does not have the attaching portion 25.

The vehicle antenna device 30 does not need to have the second antenna component 34.

Figure 4:
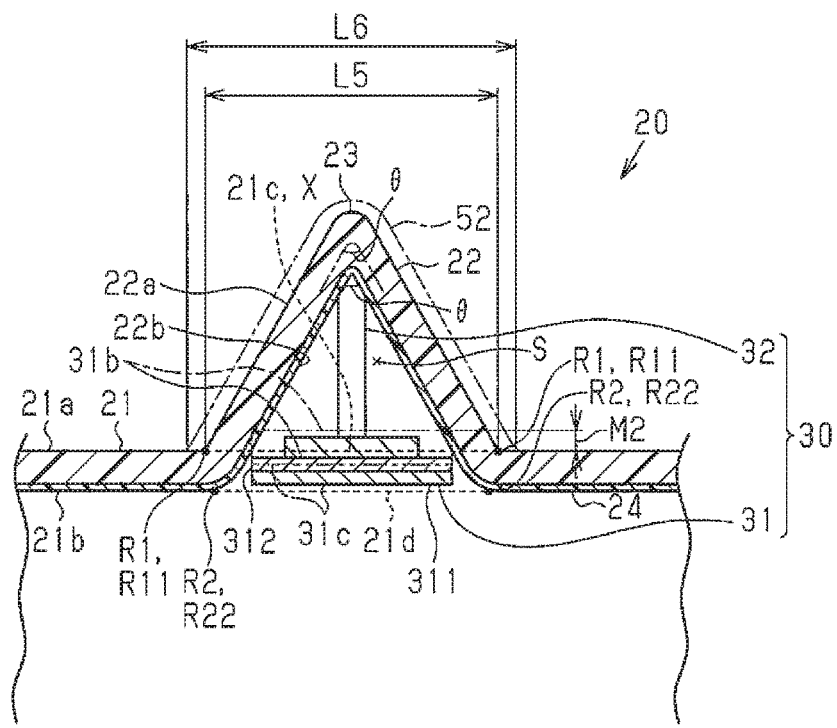
FIG. 4 is a cross-sectional view of a modification of the arrangement of the vehicle antenna device.

The entire base portion 31 of the vehicle antenna device 30 does not need to be located below the outer imaginary plane 21c as shown in FIG. 3. It is only required that part of the base portion 31 is located below the outer imaginary plane 21c. For example, as shown by the solid lines in FIG. 4, the inner surface (the lower surface) 31c of the base portion 31 is located above the inner imaginary plane 21d, but it is only required that the outer surface (the upper surface) 31b of the base portion 31 is located below the outer imaginary plane 21c. The outer surface 31b of the base portion 31 may be at a position shown by the long dashed short dashed lines in FIG. 4. That is, the outer surface 31b of the base portion 31 is located above the outer imaginary plane 21c, but it is only required that the inner surface 31c of the base portion 31 is located below the outer imaginary plane 21c. In an example shown by the long dashed short dashed lines, the projecting length of the base portion 31 from the outer imaginary plane 21c is the length M2, which is shorter than the length M1. In an example shown by the solid lines, the external dimension of the antenna cover portion 22 in the vehicle width direction is denoted by a length L5, whereas in the example shown by the long dashed short dashed lines, the external dimension of the antenna cover portion 52 in the vehicle width direction is denoted by a length L6. In this case, the internal space S for accommodating the base portion 31 in the antenna cover portion 22 is reduced according to the base portion 31 being located below the outer imaginary plane 21c. The length L5 is thus shorter than the length L6.

Figure 5:
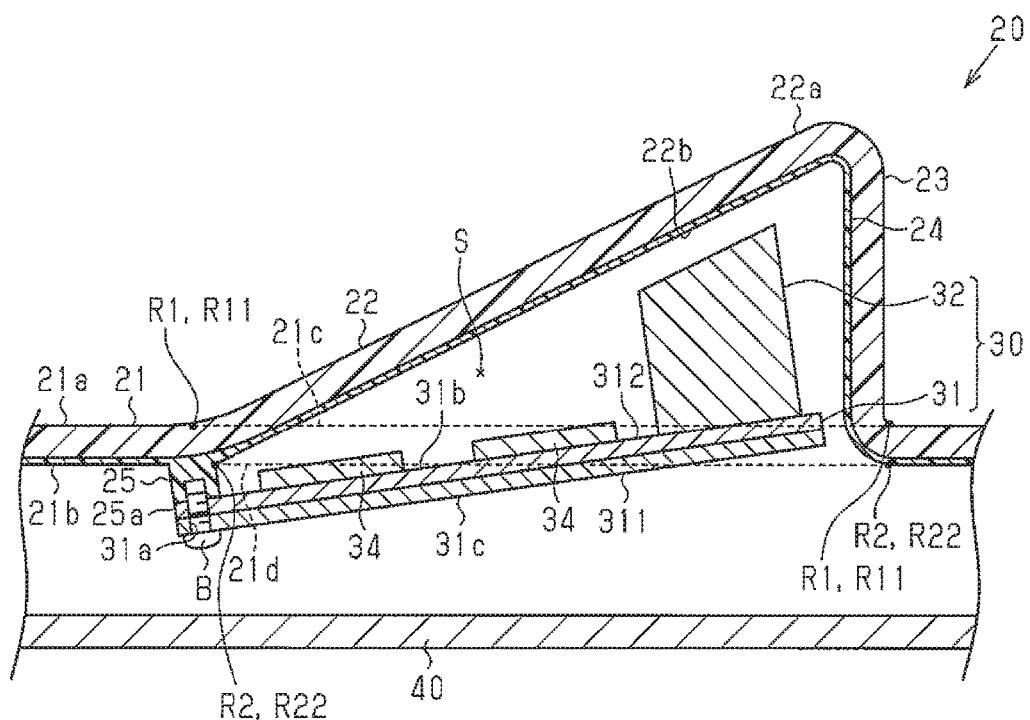
FIG. 5 is a cross-sectional view of another modification of the arrangement of the vehicle antenna device.

The entire base portion 31 of the vehicle antenna device 30 does not need to be located below the outer imaginary plane 21c as shown in FIG. 3. It is only required that part of the base portion 31 is located below the outer imaginary plane 21c. For example, if the distal end 25a of the attaching portion 25 is inclined obliquely upward in the rearward direction of the vehicle 10 as shown in FIG. 5, the base portion 31 is attached via the attaching portion 25 to the vehicle 10 so as to be inclined obliquely upward in the rearward direction of the vehicle 10. In such a state, a front part of the base portion 31 is located below the outer imaginary plane 21c, but a rear part of the base portion 31 is located above the outer imaginary plane 21c.

The roof portion 21 does not need to be integrally molded with the antenna cover portion 22, and the roof portion 21 and the antenna cover portion 22 may be molded separately. When the roof portion 21 and the antenna cover portion 22 are molded separately, it is preferable to attach the vehicle antenna device 30 to the roof portion 21 so that at least part of the base portion 31 of the vehicle antenna device 30 is located below the outer imaginary plane 21c. For example, a recess may be provided in the roof portion 21. The vehicle antenna device 30 may be attached to the roof portion 21 so that the base portion 31 of the vehicle antenna device 30 abuts against the bottom of the recess. Thereafter, the antenna cover portion 22 may be attached from a vehicle outer side of the roof portion 21. The roof portion 21 and the antenna cover portion 22 may be molded of the same material or of different materials.

The upper end of an antenna cover portion when the entire base portion is located above the outer imaginary plane 21c (the upper end of the antenna cover portion 52 shown by the long dashed short dashed lines in FIG. 3) may be at the same level as the upper end of the antenna cover portion 22 when at least part of the base portion 31 is located below the outer imaginary plane 21c. In such a case, when at least part of the base portion 31 is located below the outer imaginary plane 21c, the projecting length of the first antenna component 32 from the base portion 31 increases as compared to the case where the entire base portion is located above the outer imaginary plane 21c. The height of the antenna cover portion 22 does not change, but the width of the antenna cover portion 22 decreases, resulting in downsizing of the antenna cover portion 22. As the projecting length of the first antenna component 32 from the base portion 31 increases, the length of a receiving portion of an antenna increases, resulting in an improvement in receive sensitivity.

The dimension of the board 312 in the vehicle width direction (the dimension of the board 312 in the short-side direction in the embodiment) may be less than that of the bottom plate 311. In such a case, the dimension of the board 312 in the vehicle width direction is less than that of the bottom plate 311, and thus an end in the width-direction of the board 312 does not abut against the inside of the antenna cover portion 22. Consequently, it is only required to leave a space for accommodating the base portion 31 in the antenna cover portion 22 so that the end in the width-direction of the bottom plate 311 does not abut against the inside of the antenna cover portion 22. That is, the bottom plate 311 has the longest dimension in the vehicle width direction in the base portion 31, and thus it is only required to prevent the end in the width-direction of the bottom plate 311 from abutting against the antenna cover portion 22.

The base portion 31 may be constituted by solely the board 312.

The dimension of the board 312 in the front-rear direction (the dimension of the board 312 in the long-side direction in the embodiment) may be less than that of the bottom plate 311 in the front-rear direction. In such a case, the board 312 does not need to be opposed to the attaching portion 25, and the insertion hole 31a into which the screw B is inserted may be provided only in the bottom plate 311.

Regarding the shape of the antenna cover portion 22, the external dimension of the antenna cover portion 22 near the base portion 31 may vary depending on the projecting length of the base portion 31 from the outer imaginary plane 21c while the opening angle θ is constant regardless of the projecting length of the base portion 31 from the outer imaginary plane 21c as shown in FIG. 6B.

The shape of the antenna cover portion 22 may be changed by changing the opening angle θ according to the projecting length of the base portion 31 from the outer imaginary plane 21c. In the example described with reference to FIG. 3, the opening angle θ shown by the solid line may be less than the opening angle θ shown by the long dashed short dashed. As the projecting length of the base portion 31 from the outer imaginary plane 21c decreases, the opening angle θ decreases. Consequently, the external dimension of the antenna cover portion 22 can be reduced.

The roof panel 20 may be molded of materials other than plastic (for example, metallic materials). The antenna cover portion 22 is preferably molded of a material that does not block transmission and reception of radio waves.

The roof panel 20 may be movable. For example, an opening is provided in the roof 11 and a support portion that supports the roof panel 20 is provided at an edge of the opening in the vehicle width direction. The roof panel 20 may be movable with respect to the opening while being supported by the support portion so as to open or close the opening. In such a case, the roof panel 20 may be also integrated with the antenna cover portion 22.

When the vehicle antenna device 30 is mounted on the rear part of the roof 11, the rear part of the roof 11 may be made of plastic and the remaining portion of the roof 11 may be made of a metal plate. Only the minimum area of the rear part of the roof 11 on which the vehicle antenna device 30 is mounted may be made of a plastic panel, and the remaining portion of the roof 11 may be made of a metal plate.

The roof panel 20 may be integrated with a rear window, thus constituting a plastic panel. When the vehicle antenna device 30 is mounted on the rear part of the roof 11, the rear part of the roof 11 may be integrated with the rear window, thus constituting a plastic panel, whereas the remaining portion of the roof 11 may be made of a metal plate. The minimum area of the rear part of the roof 11 on which the vehicle antenna device 30 is mounted may be integrated with the rear window, thus constituting a plastic panel, whereas the remaining portion of the roof 11 may be made of a metal plate.

The roof panel 20 may be provided by single molding.

The roof panel 20 may transmit or block light.

The mounting position of the vehicle antenna device 30 is not limited to the rear part of the vehicle 10. For example, the vehicle antenna device 30 may be mounted on the front part of the vehicle 10 or on the substantial center of the roof 11.

The technical ideas obtainable from the above embodiment and the modifications are described below.

(A) A vehicle comprising a roof panel and a vehicle antenna device, wherein the roof panel includes a roof portion and an antenna cover portion that protrudes from the roof portion and has an internal space, the vehicle antenna device includes a base portion and an upright portion that extends from the base portion into the internal space in the antenna cover portion, the roof panel is made of plastic, and the roof portion is integrally molded with the antenna cover portion.

When a roof portion and an antenna cover portion are separate members (for example, see Patent Document 1), it is necessary to provide a member for attaching the antenna cover portion to the roof portion and a sealing member for closing the gap between the roof portion and the antenna cover portion. Consequently, it takes time to attach the antenna cover portion to the roof portion and the costs of such attachment increases. However, the roof portion is integrally molded with the antenna cover portion and thus it is possible to save time and effort to attach the antenna cover portion to the roof portion. Additionally, it is possible to reduce the costs of attaching the antenna cover portion to the roof portion. When the roof portion is integrally molded with the antenna cover portion, the base portion of the vehicle antenna device may be located above the outer imaginary plane.

The invention claimed is:

1. A vehicle comprising:
a roof panel; and
a vehicle antenna device, wherein
the roof panel includes a roof portion and an antenna cover portion that are made of plastic, wherein the antenna cover portion protrudes from the roof portion and the antenna cover portion has an internal space, wherein the roof portion is a part of the roof panel where the antenna cover portion is not provided,
the roof portion and the antenna cover portion are formed as one integrally molded article,
the vehicle antenna device includes a base portion and an upright portion that extends from the base portion into the internal space in the antenna cover portion,
an outer imaginary plane is assumed to extend along a boundary line on a boundary portion between an outer surface of the roof portion and an outer surface of the antenna cover portion, and
in a state where the vehicle antenna device is mounted on the vehicle, at least part of the base portion is located below the outer imaginary plane.

2. The vehicle according to claim 1, wherein
an inner imaginary plane is assumed to extend along a boundary line on a boundary portion between an inner surface of the roof portion and an inner surface of the antenna cover portion, and
in a state where the vehicle antenna device is mounted on the vehicle, the base portion is located, as a whole, below the outer imaginary plane and the inner imaginary plane.

3. The vehicle according to claim 1, wherein
the roof panel includes an attaching portion for attaching the vehicle antenna device to the roof panel, and the attaching portion is integrally molded with the roof panel.

4. A vehicle antenna device attached to a vehicle that includes a roof panel, wherein the roof panel includes a roof portion and an antenna cover portion that are made of plastic, wherein the antenna cover portion protrudes from the roof portion and the antenna cover portion has an internal space, wherein the roof portion is a part of the roof panel where the antenna cover portion is not provided, the vehicle antenna device comprising:
a base portion; and
an upright portion that extends from the base portion into the internal space in the antenna cover portion, wherein
an outer imaginary plane is assumed to extend along a boundary line on a boundary portion between an outer surface of the roof portion and an outer surface of the antenna cover portion, and
in a state where the vehicle antenna device is mounted on the vehicle, an upper surface of the base portion is attached via an attaching portion to the roof panel, which is an integrally molded plastic article including the roof portion and the antenna cover portion, so that at least part of the base portion is located below the outer imaginary plane.

5. The vehicle antenna device according to claim 4, wherein
an inner imaginary plane is assumed to extend along a boundary line on a boundary portion between an inner surface of the roof portion and an inner surface of the antenna cover portion, and
in a state where the vehicle antenna device is mounted on the vehicle, the base portion is located, as a whole, below the outer imaginary plane and the inner imaginary plane.

6. The vehicle antenna device according to claim 4, wherein the vehicle antenna device is attached to the attaching portion that is integrally molded with the roof panel.

* * * * *